United States Patent [19]

Herran et al.

[11] Patent Number: 4,927,708

[45] Date of Patent: May 22, 1990

[54] FLEXIBLE STRETCH/SHRINK FILM

[75] Inventors: Vincent W. Herran, Greenville; George D. Wofford, Duncan, both of S.C.

[73] Assignee: W. R. Grace & Co.-Conn., Duncan, S.C.

[21] Appl. No.: 225,588

[22] Filed: Jul. 26, 1988

Related U.S. Application Data

[63] Continuation of Ser. No. 36,750, Apr. 10, 1987, abandoned.

[51] Int. Cl.$^5$ ................... B32B 27/32; B32B 27/06
[52] U.S. Cl. ................... 428/332; 428/516; 428/520; 428/910; 264/176.1
[58] Field of Search ............. 428/35, 516, 332, 520, 428/910

[56] References Cited

U.S. PATENT DOCUMENTS

| | | | |
|---|---|---|---|
| 4,514,465 | 4/1985 | Schoenberg | 428/520 X |
| 4,617,241 | 10/1986 | Mueller | 428/528 |
| 4,640,856 | 2/1987 | Ferguson et al. | 428/36 |
| 4,671,987 | 6/1987 | Knott, II et al. | 428/216 |
| 4,778,699 | 10/1988 | Knox, III et al. | 428/516 |

FOREIGN PATENT DOCUMENTS 0145945 6/1985 European Pat. Off. .

OTHER PUBLICATIONS

UCAR FLX VLDPE, From Union Carbide Corporation, Jun. 5, 1986.
Plastics Engineering, Sep. 1985, pp. 59 to 62.
Plastics Technology, Oct. 1984, pp. 13 and 15.
Plastics World, Oct. 1984, pp. 8 and 9.
Plastic World, Oct. 1984, p. 86.
Modern Plastics Encyclopedia, 1986-87 pp. 62 and 63.

Primary Examiner—P. C. Ives
Attorney, Agent, or Firm—John J. Toney; William D. Lee, Jr.; Mark B. Quatt

[57] ABSTRACT

A multi-layered thermoplastic polyolefin film having an improved combination of physical characteristics is disclosed. In particular, the multi-layered film evidences an improved combination of abuse resistance, elongation, and flexibility. Preferred five layer embodiments of the film comprise (1) a core layer of very low density polyethylene; (2) two adjacent intermediate layers of a linear low density polyethylene and (3) two outer layers of an ethylene vinyl acetate copolymer or very low density polyethylene.

4 Claims, 1 Drawing Sheet

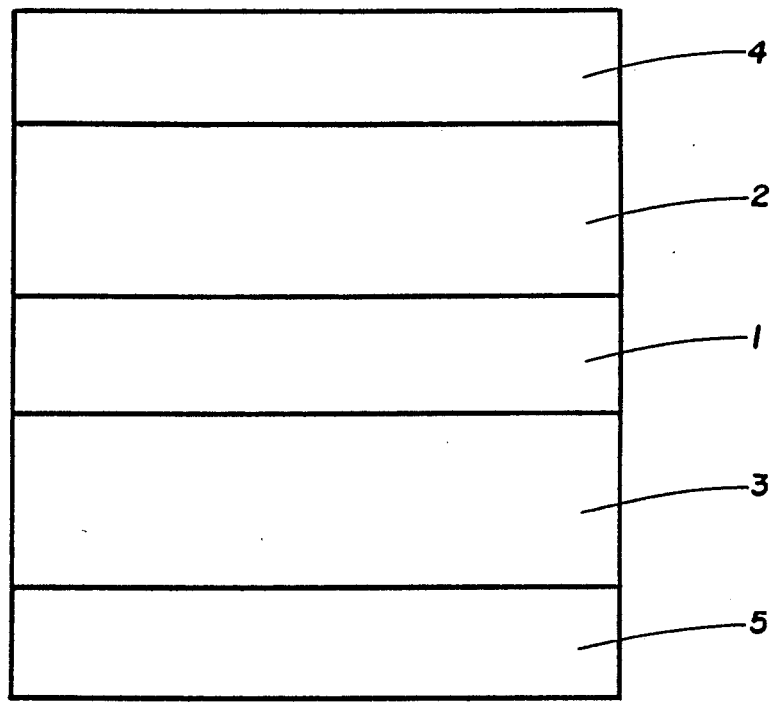
FIG I

FLEXIBLE STRETCH/SHRINK FILM

This application is a continuation of application Ser. No. 036,750 filed on Apr. 10, 1987, now abandoned.

FIELD OF THE INVENTION

The present invention relates to a heat shrinkable, thermoplastic packaging film. In particular, the invention is directed to multi-layer stretch/shrink films comprising an interior layer of a very low density polyethylene, intermediate layers comprising linear low density polyethylene and two outer layers comprising either ethylene vinyl acetate copolymer or very low density polyethylene whereby certain desired combinations of physical characteristics beneficially result.

BACKGROUND OF THE INVENTION

The present invention is directed to new and useful multi-layer heat shrinkable film formulations. One distinguishing feature of a shrink film is the film's ability, upon exposure to a certain temperature, to shrink or, if restrained from shrinking, to generate shrink tension within the film.

The manufacture of shrink films, as is well known in the art, may be generally accomplished by extrusion (single layer films) or coextrusion (multi-layer films) of thermoplastic resinous materials which have been heated to their flow or melting point from an extrusion or coextrusion die in, for example, either tubular or planar (sheet) form. After a post extrusion quenching to cool by, for example, the well-known cascading water method, the relatively thick "tape" extrudate is then reheated to a temperature within its orientation temperature range and stretched to orient or align the crystallites and/or molecules of the material. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range it is easy to effectively orient the material.

The terms "orientation" or "oriented" are used herein to generally describe the process step and resultant product characteristics obtained by stretching and immediately cooling a resinous thermoplastic polymeric material which has been heated to a temperature within its orientation temperature range so as to revise the inter-molecular configuration of the material by physical alignment of the crystallites and/or molecules of the material to improve certain mechanical properties of the film such as, for example, shrink tension and orientation release stress. Both of these properties may be measured in accordance with ASTM D 2838-81. When the stretching force is applied in one direction uniaxial orientation results. When the stretching force is applied in two directions biaxial orientation results. The term oriented is also herein used interchangeably with the term "heat shrinkable" with these terms designating a material which has been stretched and set by cooling while substantially retaining its stretched dimensions. An oriented (i.e. heat shrinkable) material will tend to return to its original unstretched (unextended) dimensions when heated to an appropriate elevated temperature.

Returning to the basic process for manufacturing the film as discussed above, it can be seen that the film, once extruded (or coextruded if it is a multi-layer film) and initially cooled by, for example, cascading water quenching, is then reheated to within its orientation temperature range and oriented by stretching. The stretching to orient may be accomplished in many ways such as, for example, by "blown bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly quenched while substantially retaining its stretched dimensions to rapidly cool the film and thus set or lock-in the oriented molecular configuration.

Of course, if a film having little or no orientation is desired, e.g. non-oriented or non-heat shrinkable film, the film may be formed from a non-orientable material or, if formed from an orientable material may be "hot blown". In forming a hot blown film the film is not cooled immediately after extrusion or coextrusion but rather is first stretched shortly after extrusion while the film is still at an elevated temperature above the orientation temperature range of the material. Thereafter, the film is cooled, by well-known methods. Those of skill in the art are well familiar with this process and the fact that the resulting film has substantially unoriented characteristics. Other methods for forming unoriented films are well known. Exemplary, is the method of cast extrusion or cast coextrusion which, likewise, is well known to those in the art.

After setting the stretch-oriented molecular configuration the film may then be stored in rolls and utilized to tightly package a wide variety of items. In this regard, the product to be packaged may first be enclosed in the heat shrinkable material by heat sealing the shrink film to itself where necessary and appropriate to form a pouch or bag and then inserting the product therein. If the material was manufactured by "blown bubble" techniques the material may still be in tubular form or it may have been slit and opened up to form a sheet of film material. Alternatively, a sheet of the material may be utilized to over-wrap the product. These packaging methods are all well known to those of skill in the art. Thereafter, the enclosed product may be subjected to elevated temperatures by, for example, passing the enclosed product through a hot air or hot water tunnel. This causes the enclosing film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable to first slit the tubular film to form a film sheet and thereafter form the sheet into bags or pouches. Such bag or pouch forming methods, likewise, are well known to those of skill in the art.

The above general outline for manufacturing of films is not meant to be all inclusive since such processes are well known to those in the art. For example, see U.S. Pat. Nos. 4,274,900; 4,229,241; 4,194,039; 4,188,443; 4,048,428; 3,821,182 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating rather than by an extrusion or coextrusion process as was discussed above. In extrusion coating a first tubular layer is extruded and thereafter an additional layer or layers is sequentially coated onto the outer surface of the first tubular layer or a successive layer. Exemplary of this method is U.S. Pat. No. 3,741,253. This patent is generally representative of an extrusion coating process and is hereby incorporated by reference.

Many other process variations for forming films are well known to those in the art. For example, multiple layers may be first coextruded with additional layers thereafter being extrusion coated thereon. Or two multi-layer tubes may be coextruded with one of the tubes thereafter being extrusion coated or laminated onto the other. The extrusion coating method of film formation is preferable to coextruding the entire film when it is desired to subject one or more layers of the film to a treatment which may be harmful to one or more of the other layers. Exemplary of such a situation is a case where it is desired to irradiate one or more layers of a film containing an oxygen barrier layer comprised of one or more copolymers of vinylidene chloride and vinyl chloride. Those of skill in the art generally recognize that irradiation is generally harmful to such oxygen barrier layer compositions. Accordingly, by means of extrusion coating, one may first extrude or coextrude a first layer or layers, subject that layer or layers to irradiation and thereafter extrusion coat the oxygen barrier layer and, for that matter, other layers sequentially onto the outer surface of the extruded previously irradiated tube. This sequence allows for the irradiation cross-linking of the first layer or layers without subjecting the oxygen barrier layer to the harmful effects thereof.

Irradiation of an entire film or a layer or layers thereof may be desired so as to improve the film's resistance to abuse and/or puncture and other physical characteristics. It is generally well known in the art that irradiation of certain film materials results in the cross-linking of the polymeric molecular chains contained therein and that such action generally results in a material having improved abuse resistance.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage between about 1 MR and about 20 MR, with a preferred dosage range of about 2 MR to about 12 MR. Irradiation can be carried out conveniently at room temperature, although higher and lower temperatures, for example, 0° to 60° may be employed.

Cross-linking may also be accomplished chemically through utilization of peroxides as is well known to those of skill in the art. A general discussion of cross-linking can be found at pages 331 to 414 of volume 4 of the Encyclopedia of Polymer Science and Technology, Plastics, Resins, Rubbers, Fibers published by John Wiley & Sons, Inc. and copyrighted in 1966. This document has a Library of Congress Catalog Card Number of 64-22188 and the referenced pages are hereby incorporated by reference.

Another possible processing variation is the application of a fine mist of a silicone or anti-fog spray to the interior of the freshly extruded tubular material to improve the further processability of the tubular material. A method and apparatus for accomplishing such internal application is disclosed in U.S. Pat. No. 4,612,245.

The polyolefin family of shrink films and, in particular, the polyethylene family of shrink films provide a wide range of physical and performance characteristics such as, for example, shrink force (the amount of force that a film exerts per unit area of its cross-section during shrinkage), the degree of free shrink (the reduction in linear dimension in a specified direction that a material undergoes when subjected to elevated temperatures while unrestrained), tensile strength (the highest force that can be applied to a unit area of film before it begins to tear apart), heat sealability, shrink temperature curve (the relationship of shrink to temperature), tear initiation and tear resistance (the force at which a film will begin to tear and continue to tear), optics (gloss, haze and transparency of material), elongation (the degree the film will stretch or elongate at room temperature), elastic memory (the degree a film will return to its original unstretched (unelongated) dimension after having been elongated at room temperature), and dimensional stability (the ability of the film to retain its original dimensions under different types of storage conditions). Film characteristics play an important role in the selection of a particular film and they differ for each type of packaging application and for each type of package. Consideration must be given to the product size, weight, shape, rigidity, number of product components and other packaging materials which may be utilized along with the film material and the type of packaging equipment available.

In view of the many above-discussed physical characteristics which are associated with polyolefin films and films containing a polyolefin constituent and in further view of the numerous applications with which these films have already been associated and those to which they may be applied in the future, it is readily discernable that the need for ever improving any or all of the above described physical characteristics or combinations thereof in these films is great, and, naturally, ongoing. In particular, the quest for a heat shrinkable polyethylene film having an improved combination of elongation, abuse resistance, and flexibility has been ongoing since such a film could compete well in the trayed product (for example, meat such as poultry parts) overwrap market. Historically, polyvinyl chloride (PVC) films have been utilized in this overwrap application because of their good degree of elongation and elastic memory. PVC was superior to conventional heat shrinkable films with regard to overwrapped trayed products which were subject to moisture loss because the PVC was elastic and continued to contract as the product lost moisture and shrank during the distribution cycle. The result was a tight package which was somewhat unattractive because it was leaky. The elasticity of PVC also allowed automatic overwrapping machinery to stretch the PVC material about the trayed product during overwrapping of the product and the associated tray. In spite of the fact that the package was leaky, PVC proved superior to conventional heat shrink packages because such conventional packaging materials possessed relatively poor elasticity or elastic memory.

Thus, when a product wrapped in such a material shrank from moisture loss during the distribution cycle the film did not also shrink and the result was a loose package having a shopworn appearance.

Unfortunately, PVC has several drawbacks associated therewith which those in the art wish to improve upon or wholly eliminate. Exemplary of these drawbacks is the fact that PVC tray overwrap film generally evidences both (1) poor seal integrity and (2) poor abuse resistance.

The poor seal integrity of PVC overwrap films arises at least in part from the fact that the PVC material in PVC overwrapped trays is tack welded to itself as opposed to being hermetically sealed. Thus, the liquid purge or juices which exude from the overwrapped trayed meat products will leak through a tack sealed PVC overwrapped tray and result in a package that is unsightly and messy from a consumer viewpoint. This drawback appears to be irreconcilably linked to PVC since attempts to hermetically seal PVC in a commercial tray overwrap environment usually result in "burn-through" of the PVC material.

Another major drawback of PVC tray overwrap material is, as stated above, the material's poor resistance to abuse. In this regard the PVC material tends to tear along the edges of the overwrapped tray if rubbed during transit by another tray or an enclosing carton.

Past attempts to produce a heat shrinkable polyolefin film which possesses satisfactory elongation and elastic memory have resulted in a film which is deficient in its resistance to tear propagation. That is to say the film has the tendency to tear rapidly or "zipper" once punctured. The "zippering" problem is of great concern since this trait substantially reduces the utility of a film for applications involving automatic packaging equipment. Zippered film results in increased down time. Heat shrinkable polyolefin films having improved abuse resistance are known to those in the art. Recent developments include the film described in U. S. Pat. No. 4,617,241 which has provided a satisfactory combination of desired physical characteristics in that the film evidences a new and improved combination of physical characteristics—e.g. heat shrinkability, elongation, elastic memory, heat sealability and abuse resistance (puncture resistance and resistance to tear propagation).

However, as useful as these recent films have proven in stretch/ shrink packaging applications, in certain applications it is desirable to provide a multilayer film which in some cases provides even better elongation characteristics, improved abuse characteristics, and a lower modulus (i.e. higher flexibility) film which will improve machinability.

OBJECTS OF THE PRESENT INVENTION

Accordingly, it is a general object of the present invention to provide a tray overwrap polyolefin film that will be an improvement over the prior art tray overwrap films.

It is another object of the present invention to provide a polyolefin tray overwrap film having a desired new and improved combination of physical characteristics such as, for example, abuse resistance, elongation and flexibility.

Another object of the present invention is to provide a five layer polyolefin film having an interior core layer comprising a very low density polyethylene; two adjacent intermediate layers comprising a linear low density polyethylene and two outer layers comprising either an ethylene vinyl acetate copolymer or a very low density polyethylene.

Still further objects and the broad scope of applicability of the present invention will become apparent to those of ordinary skill in the art from the details disclosed hereinafter. However, it should be understood that the following detailed description which indicates several preferred embodiments of the present invention is only given for purposes of illustration since various changes and modifications well within the scope of the present invention will become apparent to those of ordinary skill in the art in view of the following detailed description.

DEFINITIONS

Unless specifically set forth and defined or otherwise limited, the terms "polymer" or "polymer resin" as used herein generally include, but are not limited to, homopolymers, copolymers, such as, for example block, graft, random and alternating copolymers, terpolymers etc. and blends and modifications thereof. Furthermore, unless otherwise specifically limited the terms "polymer" or "polymer resin" shall include all possible symmetrical structures of the material. These structures include, but are not limited to, isotactic, syndiotactic and random symmetries.

The terms "melt flow" as used herein or "melt flow index" is the amount, in grams, of a thermoplastic resin which can be forced through a given orifice under a specified pressure and temperature within ten minutes. The value should be determined in accordance with ASTM D 1238.

The terms "outer" or "outer layer" as used herein mean a layer of a multi-layer film which normally comprises a surface thereof in a five-layer embodiment or at least lies outside of the intermediate and core layers.

The term "core" or "core layer" as used herein usually refers to an interior layer of a multi-layer film having an odd number of layers wherein the same number of layers is present on either side of the core layer. In films having an even number of layers, the core layer can be either of the two central layers.

The term "intermediate" or "intermediate layer" as used herein refers to an interior layer of a multi-layer film which is positioned between a core layer and an outer layer of said film.

The term polyolefin as used herein refers to polymers of relatively simple olefins such as, for example, ethylene, propylene, butenes, isoprenes and pentenes; including, but not limited to, homopolymers, copolymers, blends and modifications of such relatively simple olefins.

The term "polyethylene" as used herein refers to a family of resins obtained by polymerizing the gas ethylene, $C_2H_4$. By varying the catalysts and methods of polymerization, properties such as density, melt index, crystallinity, degree of branching and cross-linking, molecular weight and molecular weight distribution can be regulated over wide ranges. Further modifications are obtained by copolymerization, chlorination, and compounding additives. Low molecular weight polymers of ethylene are fluids used as lubricants; medium weight polymers, are waxes miscible with paraffin; and the high molecular weight polymers (generally over 6,000) are resins generally used in the plastics industry. Polyethylenes having densities ranging from about 0.900 g/cc to about 0.940 g/cc are called low density polyethylenes while those having densities from about 0.941 g/cc to about 0.965 g/cc and over are called high density polyethylenes. The low density types of polyethylenes are usually polymerized at high pressures and temperatures whereas the high density types are usually polymerized at relatively low temperatures and pressures.

The term "linear low density polyethylene" (LLDPE) as used herein refers to copolymers of ethylene with one or more comonomers selected from $C_4$ to $C_{10}$ alpha olefins such as butene-1, octene, etc. in which the molecules thereof comprise long chains with few side chains branches or cross-linked structures. The side branching which is present will be short as compared to non-linear polyethylenes. Linear low density polyethylene has a density usually in the range of from about 0.916 g/cc to 0.940 g/cc for film making purposes. The melt flow index of linear low density polyethylene generally ranges from between about 0.1 to about 10 grams per ten minutes and preferably between from about 0.5 to about 3.0 grams per ten minutes. Linear low density polyethylene resins of this type are commercially available and are manufactured in low pressure vapor phase and liquid phase processes using transition metal catalysts.

The term "very low density polyethylene" (VLDPE) is used herein to describe a linear ethylene-alpha-olefin copolymer having densities of generally between 0.890 and 0.915 grams/cubic centimeter, and produced by catalytic, low pressure processes.

The term "ethylene vinyl acetate copolymer" (EVA) as used herein refers to a copolymer formed from ethylene and vinyl acetate monomers wherein the ethylene derived units in the copolymer are present in major amounts and the vinyl acetate derived units in the copolymer are present in minor amounts.

An "oriented" or "heat shrinkable" material is defined herein as a material which, when heated to an appropriate temperature above room temperature (for example 96° C), will have a free shrink of 5% or greater in at least one linear direction.

All compositional percentages used herein are calculated on a "by weight" basis.

Free shrink should be measured in accordance with ASTM D 2732.

The elongation properties of the film should be measured in accordance with ASTM D 638.

A "cross-linked" material as used herein shall be defined as a material which after refluxing in boiling toluene or xylene, as appropriate, for forty (40) hours shall have a weight percent residue of at least 5 percent. A procedure for determining whether a material is cross-linked vel non is to reflux 0.4 gram of the material in boiling toluene or another appropriate solvent, for example xylene, for twenty (20) hours. If no insoluble residue (gel) remains the material is determined not to be cross-linked. If, after twenty (20) hours of refluxing insoluble residue (gel) remains the material is refluxed under the same conditions for another twenty (20) hours. If more than 5 weight percent of the material remains upon conclusion of the second refluxing the material is considered to be cross-linked. Preferably, at least two replicates are utilized.

A rad is the quantity of ionizing radiation that results in the absorption of 100 ergs of energy per gram of a radiated material, regardless of the source of the radiation. A megarad is $10^6$ rads. (MR is an abbreviation for megarad.)

All of the above-identified ASTM standards are hereby incorporated by reference.

SUMMARY OF THE INVENTION

It has been discovered that a flexible, heat shrinkable thermoplastic packaging film having a desirable combination of physical characteristics such as, elongation, abuse resistance, flexibility, and heat shrinkability has been achieved by the multi-layer flexible, thermoplastic packaging film of the present invention. This multi-layer film comprises a core layer comprising very low density polyethylene, intermediate layers adjacent each side of the core layer comprising a linear low density polyethylene, and two outer layers each bonded to a respective intermediate layer, and comprising a polymeric material selected from the group consisting of ethylene vinyl acetate copolymer and very low density polyethylene. Preferably, the multi-layer film is both oriented and irradiated.

BRIEF DESCRIPTION OF THE DRAWING

FIG. I is a cross-sectional view of a preferred five layered embodiment of the present invention.

DESCRIPTION OF THE PREFERRED EMBODIMENT

Referring to FIG. I, which is a cross-sectional view of a five layered preferred embodiment of the present invention, it is seen that this embodiment comprises a core layer 1, two adjacent intermediate layers 2 and 3 and two skin or surface layers 4 and 5. The preferred thickness ratio of the five layers of 1/1.5/1/1.5/1 is demonstrated in FIG. I. A preferred core layer 1 formulation comprises very low density polyethylene.

Our experimentation has revealed an especially preferred core layer formulation is very low density polyethylene which may be obtained from Dow Chemical Company under the trade designation XU61512.08L. This resin is believed to have a density at 23° C. of about 0.905 gm/cm$^3$ and a melt flow rate (measured by condition E) of about 0.8 gm/10 min. Other very low density polyethylenes may be utilized to form the core layer 1, for example DSM 2H286 available from Dutch State Mines.

Returning to FIG. I, and in particular, adjacent intermediate layers 2 and 3 it has been determined that a preferred intermediate layer formulations should comprise a linear low density polyethylene material. A preferred linear low density polyethylene is Dowlex 2045.04. Other linear low density polyethylene materials or blends of two or more linear low density polyethylene materials may be utilized to form the intermediate layers 2 and 3. Preferably the composition of intermediate layers 2 and 3 is the same, however, different linear low density polyethylenes or blends thereof may be utilized for each intermediate layer. Dowlex 2045.04 is believed to have a density of about 0.920 gm/cm$^3$ and a flow rate (measured by condition E) of from about 0.7 to 1.2 gm/ten minutes.

With regard to outer layers 4 and 5 it has been determined that a preferred skin layer formulation comprises either a copolymer of ethylene and vinyl acetate, or very low density polyethylene. VLDPE utilized to form the core layer 1 may, preferably, be the same material as that which is utilized to form the two outer layers 4 and 5. A particularly preferred outer layer ethylene vinyl acetate copolymer is PE204CS284. This resin is available from El Paso Polyolefins Company, and is believed to have a density at 23° C. of from about 0.9232 grams/cubic centimeter to about 0.9250 grams/cubic centimeter and a melt flow rate (measured by condition E) of about 2.0 grams/10 minutes. Other ethylene vinyl acetate copolymers or blends of two or more ethylene vinyl acetate copolymers may be utilized to form outer layers 4 and 5. Preferably the composition of outer layers 4 and 5 is the same, however, different VLDPE resins or blends thereof, and different ethylene vinyl acetate copolymers or blends thereof, may be utilized for each outer layer.

Those skilled in the art will readily recognize that all of the above disclosed, by weight, percentages are subject to slight variation. Additionally, these percentages may vary slightly as a result of the inclusion or application of additives such as the silicone mist discussed above or agents such as slip and anti-block agents. A preferred anti-block agent is silica which is available from Johns Manville under the trade-name White Mist. Preferred slip agents are erucamide (available from Humko Chemical under the trade-name Kemamide E), and stearamide (available from the Humko Chemical Company under the trade-name Kemamide S) and N, N—' dioleoylethylenediamine (available from Glyco Chemical under the trade-name Acrawax C). A preferred silicone spray is a liquid polyorganosiloxane manufactured by General Electric under the trade designation General Electric SF18 polydimethylsiloxane.

The general ranges for inclusion or, in the case of the silicone spray, the application of these additives are as follows:
(1) silica: 250–3000 ppm
(2) N, N—' dioleoylethylenediamine: 200–4000 ppm
(3) erucamide: 200–5000 ppm
(4) stearamide: 200–5000 ppm
(5) silicone spray: 0.5 mg.ft$^2$–and up When utilized within the specification and claims of the present application the term "consisting essentially of" is not meant to exclude slight percentage variations or additives and agents of this sort.

Additional layers and/or minor amounts of additives of the types described above may be added to the film structure of the present invention as desired but care must be taken not to adversely affect the desirable physical properties and other characteristics of the inventive film.

In the preferred process for making the multi-layer film of the present invention the basic steps are coextruding the layers to form a multilayer film, irradiating the film, and then stretching the film to biaxially orient. These steps and additional desirable steps will be explained in detail in the paragraphs which follow.

The process begins by blending, if necessary, the raw materials (i.e. polymeric resins) in the proportions and ranges desired as discussed above. The resins are usually purchased from a supplier in pellet form and can be blended in any one of a number of commercially available blenders as is well known in the art. During the blending process any additives and/or agents which are desired to be utilized are also incorporated.

The resins and applicable additives and/or agents are then fed to the hoppers of extruders which feed a coextrusion die. For the preferred five-layer film having two identical outer layers and two identical intermediate layers at least 3 extruders need to be employed, one for the two outer layers, one for the two intermediate layers and one for the core layer. Additional extruders may be employed if a film having non-identical outer layers or non-identical intermediate layers is desired. The materials are coextruded as a relatively thick tube or "tape" which has an initial diameter dependent upon the diameter of the coextrusion die. The final diameter of the tubular film is dependent upon the racking ratio, e.g. the stretching ratio. Circular coextrusion dies are well known to those in the art and can be purchased from a number of manufacturers. In addition to tubular coextrusion, slot dies could be used to coextrude the material in sheet form. Well known single or multi-layer extrusion coating processes could also be utilized, if desired.

An additional process step which should be utilized to manufacture the preferred embodiment of the presently inventive film is to irradiate the tape or unexpanded tubing or sheet by bombarding it with high-energy electrons from an accelerator to cross-link the materials of the tube. Cross-linking greatly increases the structural strength of the film or the force at which the material can be stretched before tearing apart when the film materials are predominately ethylene such as polyethylene or ethylene vinyl acetate. Irradiation also improves the optical properties of the film and changes the properties of the film at higher temperatures. A preferred irradiation dosage level is in the range of from about 0.5 MR to about 12.0 MR. An even more preferred range is from about 4 MR to about 8 MR. The most preferred dosage level is approximately 7 to 8 MR.

Following coextrusion, quenching to cool and solidify, and irradiation of the tape, the extruded tape is reheated and inflated into a bubble by application of internal air pressure thereby transforming the narrow tape with thick walls into a wide film with thin walls of the desired film thickness and width. This process is sometimes referred to as the "trapped bubble technique" of orientation or as "racking". The degree of inflation and subsequent stretching is often referred to as the "racking ratio" or "stretching ratio". For example, a transverse racking or stretching ratio of 2.0 would mean that the film had been stretched 2.0 times its original extruded size in the transverse direction during transverse racking. After stretching, the tubular film is then collapsed into a superimposed lay-flat configuration and wound into rolls often referred to as "mill rolls". The racking process orients the film by stretching it transversely and longitudinally and thus imparts shrink capabilities to the film. Additional longitudinal or machine direction racking or stretching may be accomplished by revolving the deflate rollers which aid in the collapsing of the "blown bubble" at a greater speed than that of the rollers which serve to transport the reheated "tape" to the racking or blown bubble area. Preferred transverse and longitudinal stretching ratios of the present film range from between about 2.5 transverse by about 3.0 longitudinal to about 5.0 transverse and about 5.0 longitudinal. A particularly preferred stretching ratio is about 3.0 to 4.0 transverse by about 3.0 to 4.0 longitudinal. All of these methods of orientation are well known to those of skill in the art.

To further disclose and clarify the scope of the present invention to those skilled in the art the following test data are presented.

Three embodiments of the present invention were formed by coextrusion, irradiated and stretched (oriented) by application of internal air (bubble technique) in accordance with the teachings described above. That is, the five layer stretch/shrink films in accordance with the invention were produced by using four or five extruders feeding molten polymer into an annular die. The individual melt streams were brought together within the die and exited as a tube or tape. The six mil single wall tube was quenched with water as it passed over a forming shoe. The tube was then collapsed and tracked through an irradiation unit where it received between seven and eight megarads dosage. The tape was then reheated in an EQ oven and biaxially oriented to between 3.0:1 and 3.4:1 in both the longitudinal and transverse directions. The film was double wound at the rack winder. These embodiments are hereinafter designated X, Y and Z.

Embodiment X was a five layered film irradiated with approximately 7–8 MR and had an approximate layer thickness ratio of 1/1.5/1/1.5/1. Embodiment X comprised a layer structure of "A/B/C/B/A".

Embodiment Y was also a five layered film irradiated with approximately 7–8 MR and also had an approximate layer thickness ratio of 1/1.5/1/1.5/1. Embodiment Y also comprised a layer structure of "A/B/C/B/A".

Embodiment Z was likewise a five layer film irradiated with approximately 7–8 MR with a layer thickness ratio like that of the embodiments X and Y. Embodiment Z comprises a layer structure of "C/B/C/B/C".

In all of these examples A represents an ethylene vinyl acetate copolymer having from about 3.0% to about 3.6% vinyl acetate derived units (El Paso PE 204CS284); B represents a linear low density polyethylene having a density of about 0.920 gm/cm$^3$ (Dowlex 2045.04) and C represents very low density polyethylene. In the case of embodiments X and Z, the particular VLDPE resin used was Dow XU61512-08L having a density of about 0.905 and a melt index of about 8 grams per 10 minutes. In the case of embodiment Y, the VLDPE resin used was DSM2H286 having a density of about 0.902 and a melt index of about 2.2.

Data with regard to a stretch/shrink film, recorded in U.S. Pat. No. 4,617,241 having similar layer thickness ratios is also presented herewith for comparison with embodiments X, Y, and Z. This comparative example is designated "Comp. 1".

Table I, below, compares the four products with regard to several differing physical characteristics.

TABLE I

| | X | Y | Z | COMP. 1 |
|---|---|---|---|---|
| Tensile At Break And 73° F. (PSI)[1] | | | | |
| Av.[2] Long. | 164.1 × 100 | 143.6 × 100 | 142.4 × 100 | 160.5 × 100 |
| Std. Dev. | 14.0 × 100 | 11.4 × 100 | 34.6 × 100 | 8.6 × 100 |
| 95% C.L.[3] | 22.3 × 100 | 18.2 × 100 | 55.1 × 100 | 13.7 × 100 |
| Av. Trans. | 121.2 × 100 | 139.3 × 100 | 159.6 × 100 | 139.7 × 100 |
| Std. Dev. | 5.8 × 100 | 4.1 × 100 | 32.2 × 100 | 3.7 × 100 |
| 95% C.L. | 9.2 × 100 | 6.6 × 100 | 51.2 × 100 | 6.0 × 100 |
| Elongation At Break And 73° F. (%)[4] | | | | |
| Av. Long. | 196.1 | 168.7 | 220.0 | 206 |
| Std. Dev. | 15.8 | 14.1 | 35.4 | 8 |
| 95% C.L. | 25.1 | 22.4 | 56.3 | 12 |
| Av. Trans. | 163.2 | 233.7 | 248.6 | 204 |
| Std. Dev. | 2.7 | 8.7 | 27.8 | 12 |
| 95% C.L. | 4.3 | 13.8 | 44.3 | 20 |
| Modulus At 73° F. (PSI)[5] | | | | |
| Av. Long. | 23.1 × 1000 | 22.7 × 1000 | 16.7 × 1000 | 21.5 × 1000 |
| Std. Dev. | 1.7 × 1000 | 0.5 × 1000 | 0.9 × 1000 | 1.3 × 1000 |
| 95% C.L. | 2.7 × 1000 | 0.8 × 1000 | 1.5 × 1000 | 2.0 × 1000 |
| Av. Trans. | 21.8 × 1000 | 23.9 × 1000 | 13.3 × 1000 | 19.4 × 1000 |
| Std. Dev. | 0.7 × 1000 | 0.8 × 1000 | 1.4 × 1000 | 1.3 × 1000 |
| 95% C.L. | 1.2 × 1000 | 1.3 × 1000 | 2.2 × 1000 | 2.1 × 1000 |
| Free Shrink (%)[6] (180° F.) | | | | COMP. 1 (185° F.) |
| Av. Long. | 20 | 16 | 23 | 25 |
| Std. Dev. | 1 | 2 | 1 | 1 |
| 95% C.L. | 2 | 2 | 1 | 2 |
| Av. Trans. | 21 | 24 | 30 | 27 |
| Std. Dev. | 0 | 2 | 1 | 2 |
| 95% C.L. | 0 | 2 | 2 | 4 |

The following footnotes apply to Table I.
1. ASTM D882-81
2. All values in Table I are averages obtained from four (4) replicate measurements.
3. C.L. Is Confidence Limit - for example, if the reported average value was 10 and the 95% C.L. was 2, then if 100 replicate readings were made, 95 of them would have a value between 8 and 12, inclusive.
4. ASTM D882-81
5. ASTM D882-81
6. ASTM D2732-70 (reapproved 1976)

It should be understood that the detailed description and specific examples which indicate the presently preferred embodiments of the invention are given by way of illustration only since various changes and modifications within the spirit and scope of the invention will become apparent to those of ordinary skill in the art upon review of the above detailed description and examples.

In view of the above:

I claim:

1. In a multilayer thermoplastic packaging film having at least five layers, including a layer of linear low density polyethylene, the improvement wherein:
   (a) a core layer comprises a very low density polyethylene;
   (b) intermediate layers adjacent each side of the core layer comprise a linear low density polyethylene; and
   (c) two outer layers each bonded to a respective intermediate layer comprise a very low density polyethylene; wherein the film has a modulus at 73° F. of less than about 17,000 p.s.i. in the longitudinal and transverse directions.

2. The film of claim 1 wherein each layer is crosslinked.

3. The film of claim 1 having a modulus of less than about 17,000 p.s.i. in the longitudinal direction and less than about 13,000 p.s.i. in the transverse direction.

4. The film of claim 1 having an elongation, at break at 73° F. of at least about 220% in the longitudinal direction and about 250% in the transverse direction.

* * * * *